(12) United States Patent
Aigner

(10) Patent No.: US 8,389,898 B2
(45) Date of Patent: Mar. 5, 2013

(54) METHOD FOR REGULATING A WELDING CURRENT SOURCE AND WELDING CURRENT SOURCE FOR CARRYING OUT THE METHOD

(75) Inventor: Hubert Aigner, Taufkirchen (AT)

(73) Assignee: Lorch Schweisstechnik GmbH, Auenwald (DE)

( * ) Notice: Subject to any disclaimer, the term of this patent is extended or adjusted under 35 U.S.C. 154(b) by 472 days.

(21) Appl. No.: 12/657,978

(22) Filed: Jan. 29, 2010

(65) Prior Publication Data

US 2010/0193488 A1 Aug. 5, 2010

(30) Foreign Application Priority Data

Feb. 4, 2009 (DE) .......................... 10 2009 008 199

(51) Int. Cl.
*B23K 9/10* (2006.01)
(52) U.S. Cl. ............................. 219/130.32; 219/137 PS
(58) Field of Classification Search ............... 219/130.1, 219/130.31, 130.32, 130.33, 130.34, 137 R, 219/137 PS; 363/17, 65, 95, 97, 98, 131, 363/132

See application file for complete search history.

(56) References Cited

U.S. PATENT DOCUMENTS

| 4,525,621 | A | 6/1985 | Puschner |
| 5,712,771 | A | 1/1998 | Fitter et al. |
| 6,469,491 | B1 | 10/2002 | Schultz |
| 6,849,828 | B2 * | 2/2005 | Aigner ................... 219/137 PS |
| 7,457,139 | B2 * | 11/2008 | Isii et al. ........................ 363/69 |
| 2007/0217231 | A1 | 9/2007 | Ishii et al. |

FOREIGN PATENT DOCUMENTS

| DE | 32 00 086 | 7/1983 |
| DE | 103 07 066 | 5/2004 |
| JP | 59 174277 | 10/1984 |
| WO | 01/53030 | 7/2001 |

* cited by examiner

*Primary Examiner* — Toan Le

(74) *Attorney, Agent, or Firm* — Lipsitz & McAllister, LLC

(57) ABSTRACT

The invention relates to a method for regulating a welding current source with a current transformer, which has a series resonant circuit on the primary side and a parallel resonant circuit on the secondary side, the series resonant circuit being supplied with a variable alternating voltage by a bridge circuit and the parallel resonant circuit providing energy to a welding process by way of a rectifier, and a control unit controlling the bridge circuit in dependence on at least one state variable of the welding current source. In order to develop the method in such a way as to make regulation possible at low cost and with as little power loss as possible, it is proposed according to the invention that only the primary current or a state variable on the primary side corresponding to the primary current is recorded as the electrical-current state variable of the welding current source and a control signal dependent on the primary current or on the state variable corresponding thereto is fed to the control unit. A welding current source for carrying out the method is also proposed.

16 Claims, 2 Drawing Sheets

METHOD FOR REGULATING A WELDING CURRENT SOURCE AND WELDING CURRENT SOURCE FOR CARRYING OUT THE METHOD

The present disclosure relates to the subject matter disclosed in German application number 10 2009 008 199.2 of Feb. 4, 2009, which is incorporated herein by reference in its entirety and for all purposes.

BACKGROUND OF THE INVENTION

The invention relates to a method for regulating a welding current source with a current transformer, which has a series resonant circuit on the primary side and a parallel resonant circuit on the secondary side, the series resonant circuit being supplied with a variable alternating voltage by a bridge circuit and the parallel resonant circuit providing energy to a welding process by way of a rectifier, and a control unit controlling the bridge circuit in dependence on at least one state variable of the welding current source.

The invention also relates to a welding current source for carrying out the method.

Arc welding methods, in which an arc burns between a welding electrode and a workpiece, are known in various configurations. In these methods, an arc is ignited between a welding electrode and a workpiece and heats the end of the welding electrode on the arc side to such an extent that the material is transferred to the workpiece in the form of drops. The transfer of the drops may lead to the formation of a short circuit between the welding electrode and the workpiece, with the result that the welding current flowing from the welding electrode to the workpiece increases very strongly. In order that no spatter forms during the transfer to the workpiece, the welding current is usually regulated. For example, welding current sources in the form of so-called series-parallel resonant converters are known for this purpose. These comprise a current converter, usually a transformer, which has a series resonant circuit on the primary side and a parallel resonant circuit on the secondary side. The series resonant circuit is supplied with a variable alternating voltage by a bridge circuit and the parallel resonant circuit provides the required energy to the welding process by way of a rectifier. A control unit controls the bridge circuit in dependence on at least one state variable of the welding current source.

To regulate the welding current source, WO 01/53030 A1 proposes the use of two measuring devices for recording electrical-current state variables of the welding current source, to be specific a first measuring device, with which the primary current of the current transformer can be recorded, and a second measuring device, with which the secondary current of the current transformer can be recorded. The inclusion of the secondary current is necessary in the case of the regulating method disclosed in the cited document for establishing or calculating the pulse width of the alternating voltage. The recording of the secondary current requires either a shunt or a transducer which operates on the basis of the Hall principle. The use of a shunt involves a not inconsiderable power loss and the use of a transducer based on the Hall principle is relatively expensive.

It is therefore an object of the present invention to provide a method for regulating a welding current source of the type mentioned at the beginning that makes it possible for the welding current to be regulated at lower cost and with as little power loss as possible. Furthermore, it is intended to provide a welding current source for carrying out the method of this kind.

SUMMARY OF THE INVENTION

This object is achieved according to the invention in the case of a method of the type mentioned at the beginning by recording only the primary current of the current transformer or a state variable on the primary side corresponding to the primary current as the electrical-current state variable of the welding current source and feeding to the control unit a control signal dependent on the primary current or on the state variable on the primary side corresponding to the primary current.

The invention includes the idea that, in the case of a series-parallel resonant converter, simple regulation can be achieved just by recording the primary current or a state variable on the primary side corresponding to the primary current. The primary current, that is to say the current flowing in the series resonant circuit, predetermines the secondary current of the current transformer by way of the transmission ratio of the current transformer. Although, on account of the parallel resonant circuit, the secondary current is not identical to the welding current, but instead generally only part of the secondary current flows to the welding process, the maximum welding current is predetermined by the primary current. The reason for this is that, in the case of a short circuit between the welding electrode and the workpiece, that is to say when there is an arc resistance of zero ohms, the secondary current is virtually identical to the welding current. Since the secondary current is predetermined by the level of the primary current, the maximum welding current can also be predetermined by regulating the primary current or a state variable on the primary side corresponding to the primary current. All that is required for this purpose is to provide a measuring device on the primary side, while there is no need for a corresponding measuring device on the secondary side. The maximum value of the welding current can be predetermined just by regulating the primary current or a state variable on the primary side corresponding to the primary current. This may, for example, involve using a magnetic current converter of low cost and low power loss on the primary side. Current converters of this type are usually provided in any case for reasons of current monitoring, to avoid damage to the bridge circuit.

As an example of the state variable on the primary side corresponding to the primary current, the voltage dropping across a capacitor in the resonant circuit on the primary side may be recorded. This voltage corresponds to the primary current all but for a factor and a phase shift. This voltage represents a measure of the primary current and can likewise be used for the regulating process.

The regulating of the welding current source according to the invention, in which a state variable is only recorded on the primary side, but not necessarily also on the secondary side, consequently represents a very low-cost regulating method.

It is of advantage if the primary current or the state variable on the primary side corresponding to the primary current is regulated to a constant amplitude. As already explained, the maximum value of the welding current is predetermined by the amplitude of the primary current. If the primary current or the state variable on the primary side corresponding to the primary current is regulated to an amplitude that remains the same, this has the effect that the welding current changes in dependence on the arc resistance. This means that, if there is a short circuit in the arc, the welding current assumes its highest value and is reduced as the arc resistance increases.

This behavior of the welding current consequently produces an output characteristic of the current source, which represents a usable welding behavior. Although the welding current cannot be regulated exactly, since it is dependent on the arc resistance, this is quite acceptable for low-cost welding devices.

Improved regulation is achieved in the case of an advantageous embodiment of the method according to the invention by the resonant frequency of the welding current source being recorded as a further state variable and the value of the recorded primary current or of the state variable on the primary side corresponding to the primary current being corrected in dependence on the resonant frequency to form a control signal for the control unit. In the case of a configuration of this kind of the method according to the invention, in addition to the amplitude of the primary current, the frequency thereof may for example also be determined. The frequency of the primary current is identical to the resonant frequency of the welding current source. The resonant frequency is dependent on the capacitance of the parallel and series resonant circuits, on the inductance and on the arc resistance. In the case of a low-impedance arc, in particular in the case of a short circuit, the resonant frequency assumes a value that differs significantly from the resonant frequency of a high-impedance arc. The recording of the resonant frequency consequently makes it possible to deduce the actual state of the arc, in particular the recording of the resonant frequency makes it possible to detect the presence of a short circuit within a very short time and then counteract the short circuit to avoid spatter during the transfer of material between the welding electrode and the workpiece. The recording of the resonant frequency may also take place by determining the frequency of a state variable on the primary side corresponding to the primary current. The frequency thereof is also identical to the resonant frequency.

It is of particular advantage if the arc resistance of the welding process is determined from the recorded resonant frequency and if the recorded value of the primary current or of the state variable on the primary side corresponding to the primary current is corrected in dependence on the arc resistance. As already mentioned, the resonant frequency is dependent inter alia on the capacitance of the parallel resonant circuit and on the arc resistance. The values of the capacitances of the resonant circuits and the inductance are constant and predetermined at the point of manufacture by the components that are used. This makes it possible to determine the arc resistance from the value of the recorded resonant frequency. The magnitude of the arc resistance may in turn be used for the correction of the recorded primary current or the state variable on the primary side corresponding to the primary current, in order in this way to achieve improved regulation of the welding current.

In the case of the welding current sources in question here, which are based on the principle of a series-parallel resonant converter, the welding current is phase-shifted in relation to the secondary current of the current transformer by a phase angle $\phi$. The phase shift is in turn dependent on the resonant frequency and also on the capacitance of the parallel resonant circuit and the arc resistance. The capacitance of the parallel resonant circuit is predetermined at the point of manufacture. This makes it possible to determine the phase angle $\phi$ by recording the resonant frequency. In the case of an advantageous embodiment of the method according to the invention, it is therefore provided that the phase angle between the secondary current of the current transformer and the welding current is determined from the recorded resonant frequency and that the recorded value of the primary current or of the state variable on the primary side corresponding to the primary current is corrected in dependence on the phase angle. In the case of a short circuit, the phase angle is 0°, since the entire secondary current flows via the arc, whereas the phase angle approaches a value of virtually 90° if the arc is of high impedance. A very small phase angle means that the secondary current is virtually identical to the welding current and a value of the primary current used for regulating the welding current only has to be corrected by the transmission ratio of the current transformer, but there is no need for any additional correction. If, however, there is a great phase angle, this means that the secondary current deviates significantly from the welding current, and accordingly a value of the primary current used for regulating the welding current should be corrected. The phase angle consequently forms a measure of the required correction of the primary current or of a state variable on the primary side corresponding to the primary current.

It is advantageous if, for a predetermined dimensioning of the welding current source, tabular values of the resonant frequency and of the phase angle in dependence on the arc resistance are stored in a memory element and, for a recorded value of the resonant frequency, the associated value of the arc resistance and/or of the phase angle is called up from the memory element for the correction of the recorded measured value. The variation of the resonant frequency and of the phase angle in dependence on the arc resistance can be calculated for a predetermined dimensioning of the welding current source. The relationship between the arc resistance and the resonant frequency or the phase angle may be stored in a memory element in the form of a table. If the frequency of the primary current or of the state variable on the primary side corresponding to the primary current, and consequently the resonant frequency of the welding current source, is recorded, the value of the phase angle and/or of the arc resistance associated with this resonant frequency can be called up from the memory element and used for correcting the recorded value of the primary current or of the state variable on the primary side corresponding to the primary current. Alternatively, it may of course also be provided that, with a predetermined dimensioning of the welding current source, the value of the arc resistance or the phase angle between the secondary current and the welding current is calculated from the recorded resonant frequency for the correction of the primary current or of the state variable on the primary side corresponding to the primary current.

The correction of the recorded value of the primary current or of the state variable on the primary side corresponding to the primary current may take place, for example, by multiplying the recorded value by the cosine of the phase angle. In the case of welding current sources of the type in question here, the welding current is obtained from the product of the secondary current and the cosine of the phase angle between the secondary current and the welding current. Regulating the welding current can consequently be performed in a structurally simple manner by recording the amplitude and the frequency of the primary current or of the state variable on the primary side corresponding to the primary current, determining from the frequency the phase angle between the secondary current and the welding current for a predetermined dimensioning of the welding current source and then using the product of the recorded amplitude of the primary current or of the state variable on the primary side corresponding to the primary current and the cosine of the phase angle to form a control signal for the bridge circuit of the welding current source.

An improvement of the regulating method according to the invention is achieved in the case of a preferred configuration by recording as a further state variable the output voltage of the welding current source that is present at the output of the rectifier and correcting the value of the recorded primary current or of the state variable on the primary side corresponding to the primary current in dependence on the output voltage to form a control signal for the control unit. The output voltage is a measure of the welding voltage between the welding electrode and the workpiece. The output voltage is dependent on the arc resistance and the welding process can be monitored better by recording the output voltage. For example, it may be provided that, on the basis of the recorded output voltage, a voltage evaluation circuit is used to provide a signal which is included in the correction of the recorded value of the primary current or of the state variable on the primary side corresponding to the primary current.

It is of advantage if the user has the possibility of predetermining a specific welding current. This forms the setpoint value of a regulating process, the actual value of which is obtained from the corrected value of the primary current or of the state variable on the primary side corresponding to the primary current.

As mentioned at the beginning, the invention also relates to the configuration of a welding current source for carrying out the method explained above. The welding current source comprises a current transformer, which has a series resonant circuit on the primary side and a parallel resonant circuit on the secondary side. Furthermore, the welding current source comprises a bridge circuit, which provides the series resonant circuit with a variable alternating voltage, and a rectifier, which is connected to the parallel resonant circuit for delivering energy to a welding process, and a control unit for controlling the bridge circuit in dependence on at least one state variable of the welding current source. According to the invention, it is proposed that only the primary current of the current transformer or a state variable on the primary side corresponding to the primary current can be recorded as the electrical-current state variable of the welding current source and that the welding current source has a regulator for providing a control signal for the control unit in dependence on the primary current or in dependence on the state variable on the primary side corresponding to the primary current.

The welding current source according to the invention is distinguished in particular by the fact that only the primary current or a state variable on the primary side corresponding to the primary current is to be recorded, but not also the secondary current. This makes possible a configuration of very low cost and low power loss. Merely by regulating the primary current or a state variable on the primary side corresponding to the primary current, it can be ensured that the welding current changes in dependence on the arc resistance, with the result that, if there is a short circuit in the arc, the welding current assumes its highest value, limited by the predetermination of the primary current or of the state variable on the primary side corresponding to the primary current, and that the welding current is reduced as the arc resistance increases.

The bridge circuit of the welding current source may be configured as a full bridge or as a half bridge.

More advantageously, the welding current source comprises a first evaluation circuit for recording the amplitude and the frequency of the primary current or of the state variable on the primary side corresponding to the primary current. As already described, the frequency of the primary current or of the state variable on the primary side corresponding to the primary current is the resonant frequency of the welding current source and this resonant frequency is dependent on the arc resistance. Recording the resonant frequency consequently makes it possible to detect the presence of a short circuit between the welding electrode and the workpiece within a very short time, with the result that the maximum welding current can be limited, and consequently spatter during the transfer of material can be avoided.

More advantageously, the welding current source comprises a correction circuit for forming a correction value for the primary current or for the state variable on the primary side corresponding to the primary current in dependence on the resonant frequency. The resonant frequency forms a measure of the difference between the secondary current, which is proportional to the primary current, and the welding current that flows from the welding electrode to the workpiece. In dependence on the resonant frequency, the primary current or a state variable on the primary side corresponding to the primary current can be corrected, in order to make allowance for the deviation between the secondary current and the welding current.

As already explained, with a predetermined capacitance of the parallel resonant circuit, the arc resistance can be calculated from the resonant frequency. It is of particular advantage, however, if the welding current source has a memory element for storing values of the resonant frequency and of the phase angle between the secondary current of the current transformer and the welding current in dependence on the arc resistance. This makes it possible to take the values of the arc resistance and of the phase angle that are associated with a recorded resonant frequency directly from the memory element and use them for correcting the primary current or the state variable on the primary side corresponding to the primary current. This in turn allows very rapid regulation of the welding process, with the result that spatter during the transfer of material can be avoided.

In the case of an advantageous configuration of the welding current source according to the invention, it has a combinational element for combining the recorded value of the primary current or of the state variable on the primary side corresponding to the primary current with a correction value. The combinational element can be used, for example, to form the product of the recorded value of the primary current or of the state variable on the primary side corresponding to the primary current and the cosine of the phase angle. With allowance for the transmission ratio of the current transformer, this product represents a measure of the welding current, and can consequently form the actual value of a welding current regulating process.

It is preferred if the control unit can be provided with a control signal by means of the current regulator in dependence on a comparison of the corrected value of the primary current or of the state variable on the primary side corresponding to the primary current with a value of the welding current that can be predetermined by the user.

In the case of an advantageous configuration, the welding current source has a second evaluation circuit for recording the output voltage of the rectifier, the second evaluation circuit being connected to the correction circuit. As already explained, the second evaluation circuit may provide the correction circuit with a signal which is included in the correction of the recorded value of the primary current or of the state variable on the primary side corresponding to the primary current.

It is of particular advantage if the welding current source has a dynamic module for processing the correction value provided by the correction circuit. The dynamic module is disposed downstream of the correction circuit and makes it possible to include dynamic events occurring in the welding process in the regulation of the welding current. Dynamic modules of this kind are known per se to a person skilled in the art. They are described, for example, in DE-A-32 00 086 A1.

The following description of a preferred embodiment of the invention serves for more detailed explanation in conjunction with the drawings.

DETAILED DESCRIPTION OF THE INVENTION

Figure 1:
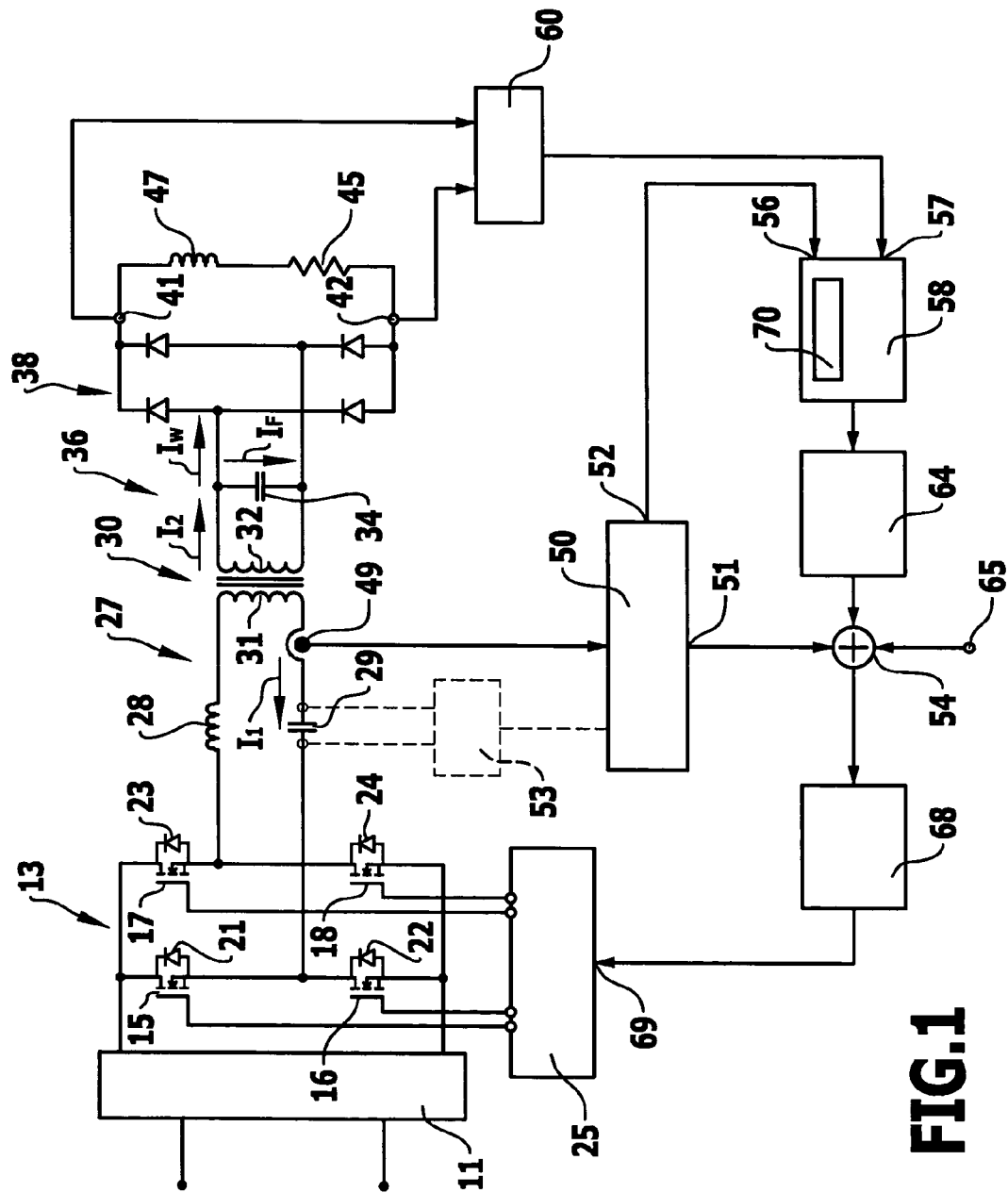
FIG. 1 shows a block diagram of a welding current source according to the invention.

In FIG. 1, a simplified block diagram of a welding current source according to the invention is schematically represented. This welding current source comprises a rectifier 11 on the input side, which is adapted to be connected in a manner that is customary and not apparent from the drawing to a power supply network, in particular to a public power supply network, such as for example an alternating voltage network with 230 V or 400 V. In the rectifier 11 on the input side, the alternating voltage provided by the power supply network is rectified.

The rectifier 11 on the input side is connected to a bridge circuit 13 and supplies it with direct current voltage. In the exemplary embodiment represented, the bridge circuit 13 is formed as a full bridge and has four switching elements 15, 16, 17, 18 with associated freewheeling diodes 21, 22, 23, 24. Bridge circuits 13 of this kind are known per se to a person skilled in the art and therefore need no further explanation here. Alternatively, the bridge circuit 13 may also be configured as a half bridge with only two switching elements and only two freewheeling diodes.

The control of the bridge circuit 13 is performed by means of a control unit 25, which activates the switching elements 15, 16, 17, 18 in such a way that the bridge circuit 13 provides an alternating voltage with a variable frequency and with a variable pulse width.

Disposed downstream of the bridge circuit 13 is a series resonant circuit 27 with a series inductance 28 and a series capacitance 29, which are connected to the primary side of a voltage converter in the form of a transformer 30. The primary coil 31 of the transformer is integrated into the series resonant circuit 27. Connected parallel to the secondary coil 32 of the transformer 30 is a parallel capacitance 34, which in combination with the secondary coil 32 forms a parallel resonant circuit 36. The parallel resonant circuit 36 is consequently disposed on the secondary side of the transformer 30, whereas the series resonant circuit 27 is disposed on the primary side of the transformer 30.

The parallel resonant circuit 36 is followed by a rectifier 38 on the output side, which rectifies the alternating voltage provided by the series resonant circuit 36 and the output voltage of which is present at the output terminals 41, 42 of the welding current source.

A welding process can be supplied with energy in the customary manner by way of the output terminals 41, 42. The welding process is represented in the equivalent circuit according to FIG. 1 by an arc resistance 45, which is connected in series with a smoothing inductance 47. The arc resistance 45 represents the resistance of the arc that ignites between a welding electrode and the workpiece to be welded. It changes over the course of time, since the formation of a short circuit may occur at a specific point in time during the transfer of material from the welding electrode to the workpiece, with the result that the arc resistance is very low and the welding current flowing via the arc resistance assumes a very high value, and at a later point in time the arc resistance may have a higher value and the welding current may be lower.

To regulate the welding current flowing via the arc resistance 45, the welding current source represented in FIG. 1 has a current transducer 49, which is connected to a first evaluation circuit 50. The evaluation circuit 50 records the amplitude and the frequency of the primary current $I_1$, i.e. the current that flows via the series inductance 28, the primary coil 31 and the series capacitance 29. By way of a first output 51, the first evaluation circuit 50 passes a signal corresponding to the amplitude of the primary current $I_1$ to a combinational element 54 and, by way of a second output 52, the evaluation circuit 50 passes a signal corresponding to the frequency of the primary current to a first input 56 of a correction circuit 58. By way of a second input 57, the correction circuit 58 is in electrical connection with a second evaluation circuit 60, which picks off and evaluates the output voltage of the welding current source that is present at the output terminals 41, 42.

Alternatively, the voltage that drops across the series capacitance 29 could also be recorded by means of a voltage recording element 53. The voltage recording element 53 could be connected to the first evaluation circuit 50, which then outputs a signal corresponding to the amplitude of the recorded voltage by way of the first output 51 and outputs a signal corresponding to the frequency of the recorded voltage by way of the second output 52. This is represented in FIG. 1 by dashed lines. The voltage dropping across the series capacitance 29 is dependent on the primary current $I_1$ and represents a state variable on the primary side corresponding to the primary current $I_1$, which could be evaluated as an alternative and/or in addition to the primary current $I_1$ and could be used as an actual value for a regulating process. The regulating process is explained below by the example of primary current recording, but it could also be performed in a corresponding manner by recording the voltage dropping across the series capacitance 29.

Disposed downstream of the correction circuit 58 is a dynamic module 64, the output of which is likewise connected to the combinational element 54.

A setpoint value of the welding current $I_W$ flowing via the arc resistance 45 may be input by way of a setpoint value input 65.

The combinational element 54 is connected to a current regulator 68, which, by way of a control input 69, provides the control unit 25 with a control signal for activating the bridge circuit 13. In the embodiment represented, the current regulator 68 is configured as a PI controller.

During the operation of the welding current source, the primary current $I_1$ flows via the series inductance 28, the primary coil 31 and the series capacitance 49. This is an alternating current, which can be recorded in a simple manner by means of the current transducer 49. The primary current $I_1$ induces in the secondary coil 32 a secondary current $I_2$, the magnitude of which is predetermined by the transmission ratio of the transformer 30. The secondary current $I_2$ is divided between the welding current $I_W$ flowing via the arc resistance 45 and the fault current $I_F$ flowing via the parallel capacitance 34. Between the secondary current $I_2$ and the welding current $I_W$ there is a phase shift with a phase angle $\phi$, the magnitude of which is dependent on the arc resistance 45 as well as on the parallel capacitance 34 and the resonant frequency of the welding current source. In the case of a short circuit, i.e. when there is a very small arc resistance 45, virtually the entire secondary current $I_2$ flows via the arc resistance 45 and the phase angle is 0°. If, however, there is a finite arc resistance 45, part of the secondary current $I_2$ flows as fault current $I_F$ via the parallel capacitance 34.

By means of the current evaluation circuit 50, the amplitude and the frequency of the primary current $I_1$ are determined. The frequency of the primary current $I_1$ is identical to the resonant frequency $\omega$ of the welding current source. The resonant frequency $\omega$ is dependent on the arc resistance 45. The same also applies to the output voltage present at the output terminals 41, 42; this is also dependent on the arc resistance 45. In the presence of a short circuit between the welding electrode and the workpiece to be welded, the output voltage breaks down for a short time.

The regulation of the welding current $I_W$ is performed on the basis of the recorded primary current $I_1$, the recorded value being corrected in dependence on the resonant frequency $\omega$ and in dependence on the output voltage of the rectifier 38 on the output side.

To correct the primary current, the value of the phase angle $\phi$ between the secondary current $I_2$ and the welding current $I_W$, corresponding to the recorded resonant frequency $\omega$ with a predetermined dimensioning of the welding current source, is taken from a table from a memory element 70 of the correction circuit 58. In addition, the output voltage present at the output terminals 41 and 42 is also included in the correction of the primary current value, and a corresponding correction value is then input to the dynamic module 64, which makes allowance for dynamic effects of the welding process and calculates from the correction value a factor by which the primary current value is multiplied. The corrected primary current value is then compared with the welding current present at the setpoint value input 65 and then a control signal for the bridge circuit 13 is formed by means of the current regulator 68, with the result that said circuit provides the series resonant circuit 27 with an alternating voltage, which results in a primary current that predetermines the desired welding current with allowance for the transmission ratio of the transformer 30 and the actual phase angle $\phi$.

Figure 2:
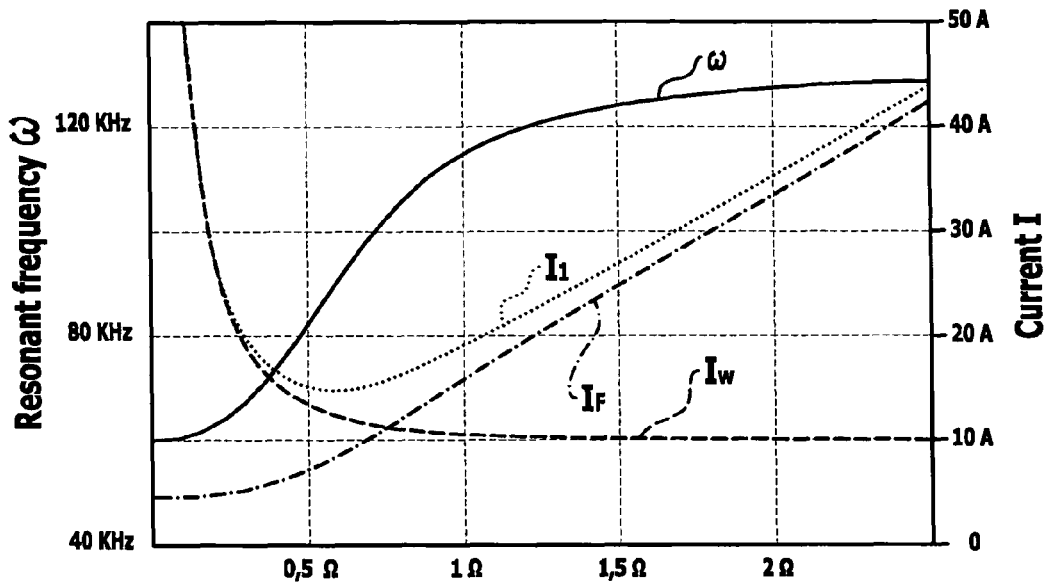
FIG. 2 shows a schematic representation of the variation of the resonant frequency, of the primary current and of the fault current of the welding current source as well as of the welding current in dependence on the resistance of an arc

The dependence of the resonant frequency $\omega$, of the primary current $I_1$, of the welding current $I_W$ and of the fault current $I_F$ flowing via the parallel capacitance 34 is illustrated in FIG. 2. The resonant frequency $\omega$ has a nonlinear dependence on the arc resistance 45. In the low-impedance range, that is to say in states in which there is virtually a short circuit between the welding electrode and the workpiece to be welded, the resonant frequency has a value that is approximately half that in the case of finite resistances of the arc. In ranges of approximately 0.3 to 0.7 ohms, there is a very strong change in the resonant frequency $\omega$; the resonant frequency $\omega$ consequently forms a measure of the arc resistance 45, and consequently of the welding process.

The current curves represented in FIG. 2 make it clear that the welding current $I_W$ in the case of a very low-impedance arc, that is to say in particular in the case of a short circuit between the welding electrode and the workpiece, corresponds virtually to the secondary current $I_2$, since the fault current $I_F$ is very small, whereas in cases of greater resistance values of the arc there is a significant deviation between the welding current $I_S$ and the secondary current. In these ranges, the fault current $I_F$ flowing via the parallel capacitance 34 increases virtually linearly.

Figure 3:
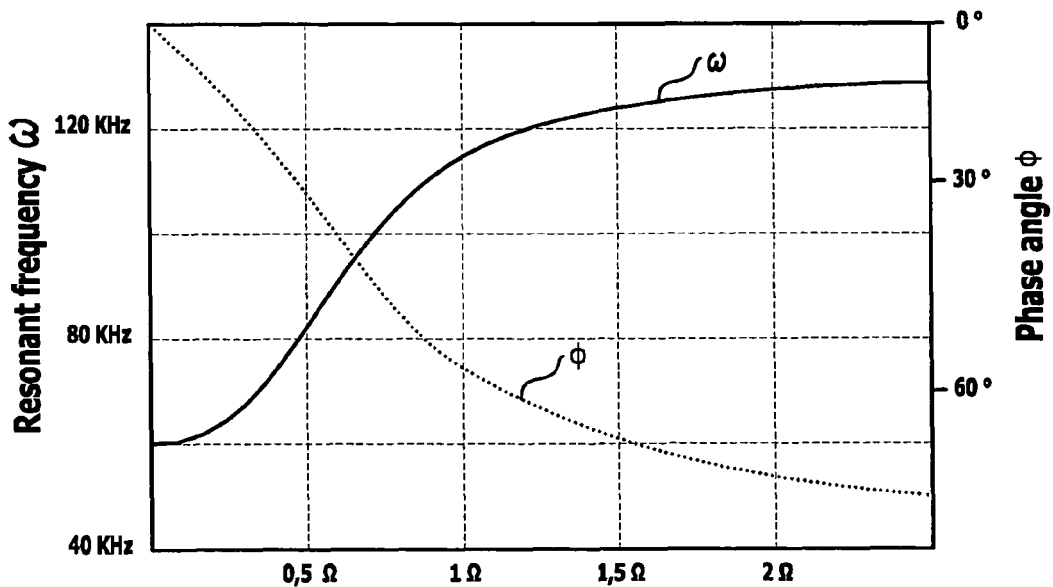
FIG. 3 shows a schematic representation of the variation of the resonant frequency and of the phase angle between the secondary current of the welding current source and the welding current in dependence on the resistance of the arc.

The variation of the phase angle $\phi$ between the secondary current $I_2$ and the welding current $I_W$ in dependence on the arc resistance 45 is clear from FIG. 3. In the case of a short circuit, the phase angle is virtually 0°, i.e. the secondary current $I_2$ is identical to the welding current $I_W$. In cases of higher resistance values of the arc, on the other hand, the phase angle $\phi$ has values up to almost 90°; in these cases, the secondary current $I_2$ flows mainly via the parallel capacitance 34 and only a very small proportion of the secondary current $I_2$ flows via the arc.

The recording of the amplitude and the frequency of the primary current or of a state variable on the primary side corresponding to the primary current (for example the amplitude and frequency of the voltage dropping across the series capacitance 29) consequently makes it possible to make statements about the welding process, in particular about the presence of a short circuit, with the result that an inadmissible increase in the welding current can be counteracted within a very short time by regulating the primary current or the state variable on the primary side corresponding thereto. This makes it possible in particular to avoid spatter during the transfer of material between the welding electrode and the workpiece.

The invention claimed is:

1. Method for regulating a welding current source with a current transformer, which has a series resonant circuit on a primary side and a parallel resonant circuit on a secondary side, the series resonant circuit being supplied with a variable alternating voltage by a bridge circuit and the parallel resonant circuit providing energy to a welding process by way of a rectifier, and a control unit controlling the bridge circuit in dependence on at least one state variable of the welding current source, the method comprising:

recording a primary current or a state variable on the primary side corresponding to the primary current as the state variable of the welding current source; and feeding a control signal dependent on the primary current or on the state variable on the primary side corresponding to the primary current to the control unit;

wherein a resonant frequency of the welding current source is recorded as a further state variable and a value of the recorded primary current or of the state variable on the primary side corresponding thereto is corrected in dependence on the resonant frequency to form a control signal for the control unit.

2. Method according to claim 1, wherein the primary current or the state variable on the primary side corresponding to the primary current is regulated to a constant amplitude.

3. Method according to claim 1, wherein:
an arc resistance of the welding process is determined from the recorded resonant frequency, and
the recorded value of the primary current or of the state variable on the primary side corresponding thereto is corrected in dependence on the arc resistance.

4. Method according to claim 1, wherein:
a phase angle between a secondary current of the current transformer and the welding current is determined from the recorded resonant frequency, and
the recorded value of the primary current or of the state variable on the primary side corresponding thereto is corrected in dependence on the phase angle.

5. Method according to claim 4, wherein, for a predetermined dimensioning of the welding current source, tabular values of the resonant frequency and of the phase angle in dependence on the arc resistance are stored in a memory element and, for a recorded value of the resonant frequency, the associated value of the arc resistance and/or of the phase angle is called up from the memory element for the correction of the recorded value of the primary current or of the state variable on the primary side corresponding thereto.

6. Method according to claim 4, wherein the recorded value of the primary current or of the state variable on the primary side corresponding thereto is multiplied by a cosine of the phase angle.

7. Method according to claim 1, wherein an output voltage of the welding current source that is present at an output of the rectifier is recorded as a further state variable and the value of the recorded primary current or of the state variable on the primary side corresponding thereto is corrected in dependence on the output voltage to form a control signal for the control unit.

8. Method according to claim 1, wherein the corrected value of the primary current or of the state variable on the primary side corresponding thereto is input as an actual value into a regulating process, a setpoint value of which can be predetermined by a user in the form of the welding current.

9. Welding current source comprising:
a current transformer, which has a series resonant circuit on a primary side and a parallel resonant circuit on a secondary side,
a bridge circuit, which provides the series resonant circuit with a variable alternating voltage,
a rectifier, which is connected to the parallel resonant circuit for delivering energy to a welding process, and
a control unit for controlling the bridge circuit in dependence on at least one state variable of the welding current source,
wherein:
a primary current of the current transformer or a state variable on the primary side corresponding to the primary current is recordable as the state variable of the welding current source,
the welding current source has a regulator for providing a control signal for the control unit in dependence on the primary current or on the state variable corresponding to the primary current.

10. Welding current source according to claim 9, wherein the welding current source has a first evaluation circuit for recording an amplitude and a frequency of the primary current or of the state variable on the primary side corresponding to the primary current.

11. Welding current source according to claim 10, wherein the welding current source has a correction circuit for forming a correction value for the recorded primary current or for the state variable on the primary side corresponding to the primary current in dependence on the resonant frequency.

12. Welding current source according to claim 11, wherein the welding current source has a memory element for storing values of the resonant frequency and of a phase angle between a secondary current of the current transformer and the welding current in dependence on an arc resistance of the welding process.

13. Welding current source according to claim 11, wherein the welding current source has a combinational element for combining the recorded value of the primary current or of the state variable on the primary side corresponding to the primary current with a correction value.

14. Welding current source according to claim 13, wherein the regulator is adapted to provide the control unit with a control signal in dependence on a comparison of the corrected value of the primary current or of the state variable on the primary side corresponding to the primary current with a setpoint value of the welding current which is predetermined by a user.

15. Welding current source according to claim 11, wherein the welding current source has a second evaluation circuit for recording an output voltage of the rectifier, the second evaluation circuit being connected to the correction circuit.

16. Welding current source according to claim 11, wherein the welding current source has a dynamic module for processing the correction value provided by the correction circuit.

* * * * *